US 6,617,019 B2

(12) United States Patent
Danner et al.

(10) Patent No.: US 6,617,019 B2
(45) Date of Patent: Sep. 9, 2003

(54) COMPOSITE PROTECTIVE COATING FOR METAL SURFACES

(75) Inventors: Mark Carl Danner, Midland, MI (US); Benjamin Robert Cohen, Pembroke, VA (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/772,063

(22) Filed: Jan. 29, 2001

(65) Prior Publication Data

US 2001/0044022 A1 Nov. 22, 2001

Related U.S. Application Data

(60) Provisional application No. 60/180,801, filed on Feb. 7, 2000.

(51) Int. Cl.[7] ............................. B32B 15/04; C09J 7/12
(52) U.S. Cl. ...................... 428/343; 428/354; 428/35.3; 428/379; 442/59
(58) Field of Search ................. 428/343, 354, 428/35.3, 379; 442/59

(56) References Cited

U.S. PATENT DOCUMENTS

| | | | |
|---|---|---|---|
| 3,908,066 A | * 9/1975 | Parkinson | 428/379 |
| 4,791,800 A | 12/1988 | Alexander | 72/180 |
| 4,838,317 A | 6/1989 | Andre et al. | 138/135 |
| 4,975,138 A | * 12/1990 | Finlayson | 156/245 |
| 5,079,052 A | * 1/1992 | Heyes et al. | 428/35.3 |
| 5,115,075 A | 5/1992 | Brennan et al. | 528/99 |
| 5,136,606 A | 8/1992 | Iehisa et al. | 372/61 |
| 5,164,472 A | 11/1992 | White et al. | 528/97 |
| 5,218,075 A | 6/1993 | Brennan et al. | 528/99 |
| 6,270,869 B1 | * 8/2001 | Zeiter et al. | 428/35.8 |
| 6,337,113 B1 | * 1/2002 | Muggli et al. | 428/35.2 |

FOREIGN PATENT DOCUMENTS

| | | | |
|---|---|---|---|
| EP | 0 284 939 A2 | 10/1988 | H05K/1/03 |
| EP | 0 857 567 A3 | 8/1998 | B31C/3/00 |

OTHER PUBLICATIONS

Abstract of JP 07026212 A.*
Journal of Applied Polymer Science, vol. 7, p. 2135, 1963.

* cited by examiner

*Primary Examiner*—Daniel Zirker
*Assistant Examiner*—Victor S. Chang

(57) ABSTRACT

Prepare a composite protective coating for metal substrates such as steel used in fabricating metal pipe or conduit. The coating, when applied to a flat metal surface, retains its bond to the metal through cold forming processes such as those used in making ribbed steel pipe. The coating resembles a sandwich of a reinforcing material layer between two adhesive films.

12 Claims, No Drawings

COMPOSITE PROTECTIVE COATING FOR METAL SURFACES

This Application claims the benefit of U.S. Provisional Application No. 60/180,801, filed Feb. 7, 2000.

BACKGROUND OF THE INVENTION

This invention relates to protective coatings for metal surfaces, more particularly to protective coatings that maintain adhesion to such metal surfaces through cold forming. This invention also relates to cold-formable protected metal surfaces. This invention still more particularly relates to cold-formable metal substrates having a protective coating applied to at least one major planar surface thereof, and to articles of manufacture fabricated from such substrates. The articles of manufacture include, for example, pipes for a variety of end use applications as well as wire and cable products.

Metal surfaces are susceptible to corrosion from various sources such as moisture, air and a wide variety of chemical compounds. This susceptibility tends to limit use of metal in a number of applications, including sanitary or storm sewer systems and industrial processes involving acidic chemical compounds.

One means of improving corrosion resistance of metal surfaces, such as the interior surfaces of metal pipe, uses a concrete liner. This approach meets with limited success because concrete fails to form a secure bond to such metal surfaces. Concrete also cracks, chips, and pulls away from the metal surface, effectively leaving the metal exposed. Another approach focuses upon forming metal pipe from plastic laminated steel sheet. WCI Steel Company of Warren, Ohio uses this approach in making a product that is known as Poly-Coat®. In general, one first laminates a plastic or polymer material, such as a carbon black filled ethylene/acrylic acid (EAA) copolymer compound, onto a surface of a suitable metal such as sheet steel. One then converts the laminate into a pipe, causing a polymer coated surface to form an inner pipe wall. The polymer coating typically has a thickness of no more than 0.10 inch (0.25 centimeter (cm)).

U.S. Pat. No. 4,975,138 discloses a method for forming a coated metal object. The method comprises three sequential steps. One first prepares a laminate that comprises an unformed metal substrate bonded to an uncoated fabric by way of a thermoplastic adhesive layer. Second, one forms the laminate into a desired shape while retaining adhesion between the substrate, fabric and thermoplastic adhesive layer. Last, one applies a coating over the fabric. Such coatings tend to lack uniformity of thickness, at least when applied to interior surfaces of the shape, such as inner pipe surfaces. In order to ensure a minimum coating thickness, one typically uses an excess of coating material, thereby increasing cost and possibly interfering with flow dynamics within the pipe.

U.S. Pat. No. 5,316,606 discloses a method for forming polymer laminated metal pipe. The method starts with sheet steel that has a co-extruded polymer layer of EAA copolymer and a polyethylene/acrylic acid blend applied to at least one of its surfaces. The coated steel sheet, after being passed through a profile former to form channels and seam members, is placed in contact with a heated polyethylene liner. Applied pressure effects bonding between the heated polyethylene liner and the coated steel sheet. The method concludes by forming the sheet steel into a section of pipe.

SUMMARY OF THE INVENTION

A first aspect of this invention is a composite protective coating for a metal surface comprising:
  a. an inner adhesive film for adhering the coating to the metal surface, the inner film comprising:
     1) a first layer of a copolymer of ethylene and acrylic acid, and
     2) a second layer of an EAA copolymer, the first layer adhering to the metal surface and the second layer adhering to the first layer;
  b. a reinforcing layer adjacent to the second layer of the inner adhesive film and bonded thereto; and
  c. an outer adhesive film adjacent to the reinforcing layer, the outer layer comprising:
     1) a first layer of an EAA copolymer, and
     2) a second layer of an EAA copolymer, the first layer adhering to the reinforcing layer and the second layer adhering to the first layer.

A second aspect of this invention is a composite protective coating for a metal surface comprising:
  a. an inner adhesive film for adhering the coating to the metal surface, the inner film comprising:
     1) a first layer of a hydroxy-phenoxyether polymer, and
     2) a second layer of a hydroxy-phenoxyether polymer, the first layer adhering to the metal surface and the second layer adhering to the first layer;
  b. a reinforcing layer adjacent to the second layer of the inner adhesive film and bonded thereto; and
  c. an outer adhesive film adjacent to the reinforcing layer, the outer layer comprising:
     1) a first layer of a hydroxy-phenoxyether polymer, and
     2) a second layer of a hydroxy-phenoxyether polymer, the first layer adhering to the reinforcing layer and the second layer adhering to the first layer.

The first layer of the outer adhesive film of the composite coatings of either the first or second aspect preferably has a surface energy that exceeds that of the second layer of the outer adhesive film. Exposure of the first layer to corona discharge, flame treatment or some other conventional surface modification provides an increase in surface energy for the first layer.

In a third aspect, this invention comprises a cold-formable coated metal object comprising:
  a. a metal substrate;
  b. the composite protective coating of either the first aspect or the second aspect.

DETAILED DESCRIPTION OF THE INVENTION

The term "interpolymer", as used herein, means a polymer having polymerized therein two or more polymerizable monomers. As such, it includes copolymers (often thought of as including two polymerizable monomers), terpolymers (three polymerizable monomers) and tetrapolymers (four polymerizable monomers). The terms "copolymer" and "interpolymer" are used interchangeably throughout this application.

The composite protective coating of the present invention comprises at least three layers. In simple terms, the coating is a sandwich of a reinforcing layer between two adhesive films, nominally an inner adhesive film and an outer adhesive film.

The inner adhesive film preferably comprises at least two layers, a first or metal adhesive layer and a second or inner base layer. The metal adhesive layer effects a bond between the composite coating and a metal substrate when the coating is applied to the substrate. The metal adhesive layer desirably comprises from 10 to 50 percent, preferably from 10 to 30 percent, and more preferably from 15 to 25 percent of total film layer thickness. With only two layers, the second layer makes up any difference between total film thickness and the metal adhesive layer thickness. If desired, the inner base layer may itself comprise two or more layers. In addition, although the first layer is nominally a metal adhesive layer, the first layer can also bond to other substrates.

Both the metal adhesive and base layers of the inner adhesive film preferably comprise a copolymer of ethylene and an ethylenically unsaturated carboxylic acid, more preferably an EAA copolymer. The EAA copolymer preferably has an acrylic acid content within a range of from 3 to 9 percent by weight (wt %) of total copolymer weight. A carboxylic acid, especially an acrylic acid, content outside the range may be used provided one accepts property variations that accompany such contents. In addition, one may use blends of two or more copolymers with differing carboxylic acid contents without departing from the scope or spirit of the present invention.

Preferred polymers for use in the first and second layers of the inner adhesive film include interpolymers of ethylene and at least one copolymerizable comonomer containing carboxyl functionality and further derivatives thereof and anhydride modified polyolefins. Suitable polymers include interpolymers of ethylene with from 1.0 to 50.0 wt % of an ethylenically unsaturated carboxylic acid such as acrylic or methacrylic acid or a $C_{1-4}$ alkyl ester thereof. Other suitable polymers include homopolymers and interpolymers of ethylene, including the above-described interpolymers, modified by reaction with a reactive carboxylic anhydride. Still other suitable polymers include copolymers of ethylene and carbon monoxide. Illustrative homopolymers include low density polyethylene (LDPE) and high density polyethylene (HDPE). Other suitable polymers include hydroxyphenoxyether polymers, also referred to as thermoplastic epoxy (phenoxy) resins. Particularly preferred copolymers include EAA copolymers, more particularly an EAA copolymer with an acrylic acid content of up to about 10 wt %, based on copolymer weight.

When used in practicing the present invention to prepare the polymer layer(s), preferred hydroxy-phenoxyether polymers include:

(1) hydroxy-functional polyethers having repeating units represented by the formula:

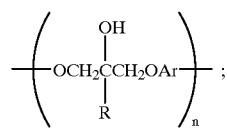

I (2) amide- and hydroxymethyl-functionalized polyethers having repeating units represented by the formula:

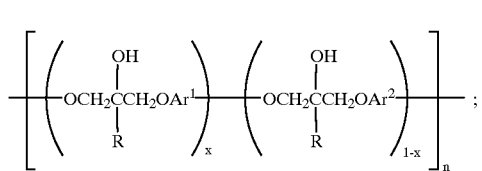

II (3) hydroxy-functional poly(ether sulfonamides) having repeating units represented by the formula:

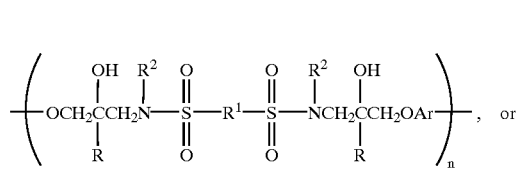

IIIa

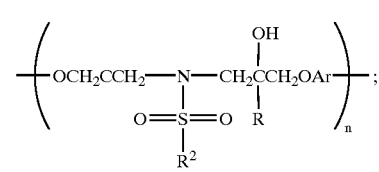

IIIb (4) poly(hydroxy amide ethers) having repeating units represented independently by any one of the following formulas:

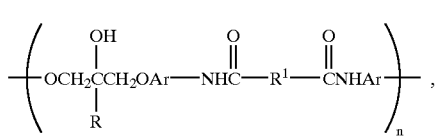

IVa

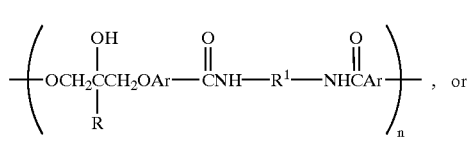

IVb

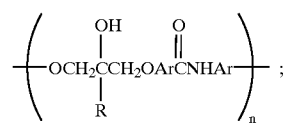

IVc (5) poly(hydroxy ester ethers) having repeating units represented by the formula:

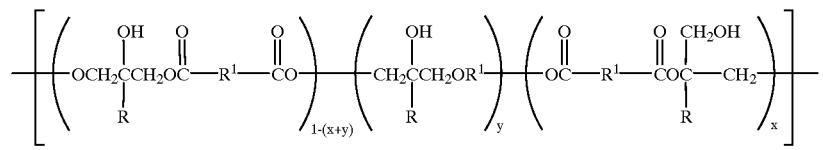

(6) poly(hydroxy amide ethers) having repeating units represented by any one of the following formulas:

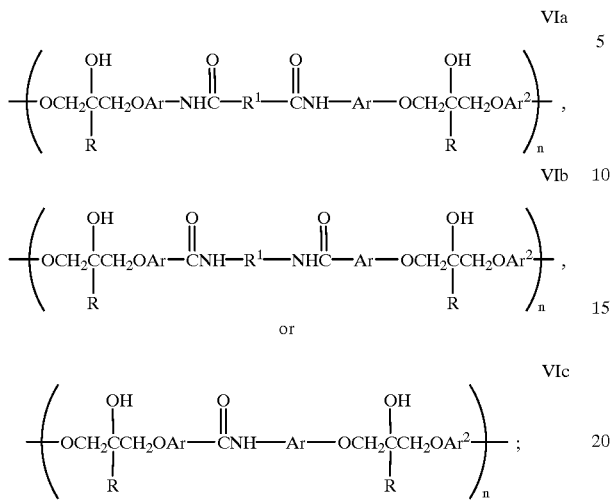

(7) poly(hydroxyamino ethers) having repeating units represented by the formula:

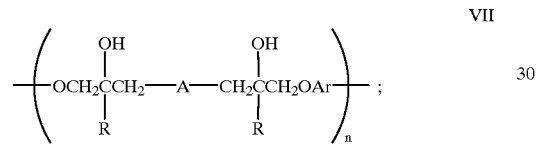

and (8) hydroxy-phenoxyether polymers having repeating units represented by the formula:

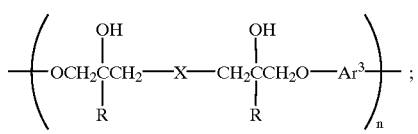

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; each $Ar^2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R^1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R^2$ is individually a monovalent hydrocarbyl moiety; A is an amine moiety or a combination of different amine moieties; X is an amine, an arylenedioxy, an arylenedisulfonamido or an arylenedicarboxy moiety or combination of such moieties; and $Ar^3$ is a "cardo" moiety represented by any one of the following formulas:

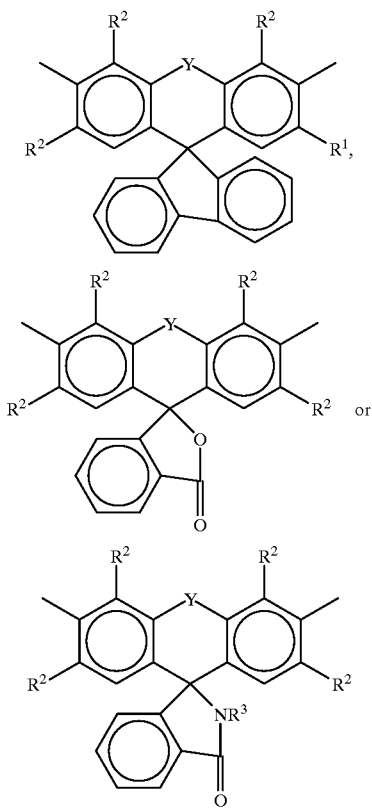

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0, and y is 0 to 0.5.

The term "predominantly hydrocarbylene" means a divalent radical that is predominantly hydrocarbon, but which optionally contains a minor amount of heteroatomic moiety such as oxygen, sulfur, imino, sulfonyl, sulfoxyl, and the like.

The hydroxy-functional polyethers represented by Formula I can be prepared, for example, by allowing a diglycidyl ether or combination of diglycidyl ethers to react with a dihydric phenol or a combination of dihydric phenols using the process described in U.S. Pat. No. 5,164,472, incorporated herein by reference in its entirety. Alternatively, hydroxy-functional polyethers result from a reaction between a dihydric phenol or combination of dihydric phenols and an epihalohydrin as described by Reinking, Barnabeo and Hale in the *Journal of Applied Polymer Science*, Volume 7, Page 2135 (1963).

Preparation of the amide- and hydroxymethyl-functionalized polyethers represented by Formula II involves, for example, a reaction between a diglycidyl ether, such as the diglycidyl ether of bisphenol A, and a dihydric phenol having pendant amido, N-substituted amido and/or hydroxyalkyl moieties, such as 2,2-bis(4-hydroxyphenyl) acetamide and 3,5-dihydroxybenzamide. U.S. Pat. No. 5,115,075 and U.S. Pat. No. 5,218,075, both entirely incorporated herein by reference, describe such a reaction.

While ethylene/carboxylic acid copolymers in general and EAA copolymers in particular may be preferred, suitable results may also be obtained when one or both layers of the inner adhesive film comprise or include a different polymer. Such different polymers include an ethylene/methacrylic acid (EMAA) copolymer, an epoxy or a grafted olefin polymer, especially a maleic anhydride (MAH) grafted polyolefin such as polyethylene.

The outer adhesive film preferably has the same layer structure and composition as the inner adhesive film. More preferably, the first layer of the outer adhesive film is modified by a surface treatment to enhance adhesion to the reinforcing layer. Corona discharge treatment using conventional apparatus and operating parameters yields satisfactory results. Flame treatment or any other technique that increases surface energy of the outer adhesive film may be used in place of corona discharge treatment. Skilled artisans readily understand conventional apparatus and operating parameters for such treatment or techniques.

The inner and outer adhesive layers of the protective coatings of the present invention may include various additives. Such additives include antiblocking agents, antioxidant agents, pigments such as carbon black or UV stabilizers. These additives are all well known in the art and commercially available from numerous suppliers. When the additive is a pigment, one may use any conventional means of introducing the pigment into an adhesive layer, preferably to a base layer of an adhesive layer. For example, one can use a concentrate of the pigment in a polymeric carrier.

The inner and outer adhesive layers may be formed by any technique known in the art. Such techniques include cast coextrusion and blown film coextrusion processes.

The reinforcing material suitably comprises any woven, knitted, or nonwoven fabric. Examples include fabrics of natural fibers such as cotton, wool, rayon, and cellulose, synthetic polymeric fibers such as aramide, polyester, polypropylene, saran, polystyrene, polyamide, acrylic, or methacrylic, and inorganic fibers such as fiberglass, carbon, steel, aluminum, stainless steel, ceramic, or alumina, prepared by any suitable weaving, stitching, tufting, bonding, spun bonding, or needling technique. A preferred fabric is a nonwoven polyester, wherein the pile is produced by needle-puncture.

The protective coating of the present invention also provides superior abrasion resistance. A protective coating's abrasion resistance weighs heavily in determining whether it meets overall performance criteria. A protective coating with a low abrasion resistance tends to wear away from a metal surface more readily and quickly than a coating with a high abrasion resistance. In other words, a low abrasion resistance coating tends to fail more rapidly than a high abrasion resistance coating. This leads, in turn, to metal surface exposure and consequent corrosion of the metal surface. The protective coatings of the present invention provide an improvement in abrasion resistance relative to metal treatments such as galvanizing or aluminizing and organic coatings such as asphalt and polymer modified asphalt. Lab scale tests, such as American Society for Testing and Materials (ASTM) G-9 Cathodic Disbondment, ASTM 926 Bedload Abrasion, Impact resistance, Freeze Thaw Testing and Rotating Disk Exposure, demonstrate this improvement.

The protective coating of the present invention is ideally suited for the protection of metal surfaces, such as steel. Although not intended to be limited to any one specific metal surface or product, the protective coating is uniquely suited for use as protective coatings for metal pipe which is formed integrally with a polymer liner. The protective coating may be used in place of the combination of HDPE liner and co-extruded thin film of EAA copolymer and polyethylene/ EAA blend taught in U.S. Pat. No. 5,316,606.

When applied a steel substrate that is then converted to a pipe, a visual inspection of the coated pipe preferably reveals substantially no delamination between the composite protective coating and the substrate following cold forming of the pipe or other object through a 90° angle as specified in ASTM 762. Delamination, when present, more preferably does not exceed 10% of the surface area of the coated pipe. Surface area delamination still more preferably does not exceed 5% and even more preferably does not exceed 2%.

U.S. Pat. No. 5,316,606, the disclosure of which is herein incorporated by reference, teaches application of a co-extruded thin film to a metal pipe surface before roll forming corrugations or ribs in sheet metal (steel). A relatively thick (compared to the thin film) HDPE liner is applied to the liner after the ribs or corrugations are formed and either prior to or subsequent to helically winding and forming the sheet steel into pipe sections.

The protective coating of the present invention has a thickness sufficient to protect a metal substrate, such as sheet steel, from abrasion for a period of time in excess of that provided by a polymer-modified asphalt coating. When used as a base for application of a further coating such as a HDPE liner, abrasion resistance increases. The protective coating of the present invention suitably has a thickness of at least 0.010 inch (0.025 centimeters (cm)). The coating may be as thick as 0.030 inch (0.076 cm). While thicker coatings may be used, they provide no appreciable increase in performance and simply increase cost of the coating. The thickness desirably falls within a range of from 0.011 to 0.025 inch (0.028 to 0.064 cm), preferably from 0.012 to 0.020 inch (0.030 to 0.051 cm). Exemplary performance results from a coating thickness of from 0.013 to 0.015 inch (0.033 to 0.038 cm), especially at a thickness of about 0.014 inch (0.036 cm).

The protective coating may be applied to any or all sides of a metal substrate, the number of coated sides depending on the desired end use. After application of the protective layer(s), the coated metal substrate or object is formed into a desired shape. Most preferably, the metal is in the form of a sheet and the protective coating does not affect subsequent corrugating, bending, drawing, or forming operations. In addition, such forming operations preferably do not affect the integrity of the protective coating.

U.S. Pat. No. 4,791,800, the relevant teachings of which are incorporated herein by reference, discloses a roll forming process and apparatus for making ribs in strip material to produce helical ribbed pipe. The resulting pipe has relatively flat areas separated by substantially rectangular ribs. One can readily use this process and apparatus to convert sheet metal strip material that is coated on one or both major planar surfaces with the protective coating of the present invention into helical ribbed pipe.

The metal substrate suitably has a thickness of 0.064 to 0.109 inch (1.6 to 2.8 millimeters (mm)). The protective coating of the present invention also works quite well with substrates having a thickness of less than 0.064 inch. Application of the protective coating to metal substrates with a thickness in excess of 0.109 inch yields varying results depending upon substrate thickness and extent of coated substrate cold forming or deformation.

Although the protective coating may be sufficient for many needs, one may, if desired, apply one or more conventional coating materials such as high density polyethylene using conventional techniques and apparatus such as rotational casting as taught by U.S. Pat. No. 4,838,317 at Column 11, Line 62 through Column 12, Line 39, or extrusion of molten polymer over pre-treated and corrugated sheet metal as taught by U.S. Pat. No. 5,316,606 at Column 4, Line 13 through Column 5, Line 41. The teachings of both U.S. Pat. No. 4,838,317 and U.S. Pat. No. 5,316,606 are incorporated herein in their entirety. Other coating materials include resinous materials, e.g. bitumen or asphalt compositions including those comprising additional materials such as mineral aggregates, rubbery copolymers such as block copolymers, plasticizers, or oils, and fibrous fillers; natural or synthetic lacquers, paints or varnishes, plastisol; reactive resin forming materials, such epoxies, polyesters, polyurethanes, etc. If desired, additional materials such as fillers or particulate solids may be incorporated into these coatings to give the surface desired properties such as abrasion resistance, skid resistance, or texture. Additional suitable coatings include those comprising portland cement and other cementitious coatings, e.g., concrete and plaster. Preferably, the coating material comprises a bitumen or asphalt material applied as a hot melt by dipping the completed formed metal object into molten coating material or alternatively by spraying the coating material thereon.

The following examples illustrate, but do not in any way limit, the present invention. All parts and percentages are based upon weight, unless otherwise specified. Arabic numerals identify examples (Ex) of the present invention and letters of the alphabet denote comparative examples (Comp Ex).

EX 1

Sandwich a 0.40 ounce per square yard (0.011 kg per 0.84 square meter) weight spunbond polyester web (straight 4.4 denier per filament fibers, Reemay® "SV" grade 2004, Xamax Industries, Inc.) between two separate two-layer EAA film webs (DAF 625, The Dow Chemical Company) to form a three web composite structure. Each two-layer film web has a thickness of six mils (0.15 millimeters) with base layer (85% of film web thickness) and a skin layer (15% of film web thickness).

The base layer comprises 96 wt % EAA copolymer (5.5 wt % acrylic acid, based on copolymer weight), 2 wt % antiblock concentrate (silicon dioxide ($SiO_2$) in a low density polyethylene (LDPE) carrier, CN 734, Southwest Chemical), 2 wt % antioxidant concentrate (85 wt % LDPE, 15 Wt % $SiO_2$, and 150 parts of di-tertiarybutyl (paracresol)), per million parts combined weight of LDPE, and $SiO_2$, CN 734, Southwest Chemical), and 11 parts by weight (pbw) of black color concentrate (Southwest 1000, Southwest Chemical) per 100 parts by weight of EAA copolymer, antiblock concentrate and antioxidant concentrate. The color concentrate comprises 62.7 wt % LDPE, 35.0 wt % furnace black, 1.8 wt % tetrakis(methylene 3,5-di-tertiarybutyl-4-hydroxyhydrocinnamate), and 0.5 wt % distearylthiodipropionate, all percentages being based on concentrate weight.

The skin layer has no color concentrate, but otherwise has the same composition as the base layer.

One film web, nominally the outer adhesive film, is subjected to corona discharge treatment in order to provide a treated skin layer. The other film web, nominally the inner adhesive film, receives no such treatment.

Prepare the sandwich by assembling the webs such that the polyester web is between the corona treated skin layer of the outer adhesive film and the base layer of the inner adhesive film. Pass the sandwich or three web composite structure between heated (160° C.) nip rolls to form a single mill roll of a composite protective coating. The nip rolls apply pressure to the sandwich to promote formation of the composite coating.

Laminate the composite protective coating to a cleaned and pretreated galvanized steel sheet (12 gauge or 0.109 inch (2.77 mm) that is preheated to a temperature of 400° Fahrenheit (° F.) (204° centigrade (° C.)) using pressure applied by neoprene nip rollers (100 pounds per square inch (689 kilopascals (Kpa)). Lamination occurs using a line speed of 125 feet per minute (38.5 meters per minute) and a temperature of 410° F. (210° C.). Quench the laminate in a 55° F. (12.8° C.) water bath.

Cold form the laminate into a 48 inch (122 cm) diameter spiral ribbed corrugated steel pipe. U.S. Pat. No. 4,791,800, incorporated herein in its entirety, U.S. Pat. No. 4,838,317, and U.S. Pat. No. 5,316,606, both previously incorporated by reference, all teach preparation of spiral ribbed corrugated steel pipe.

A visual examination of the resulting cold-formed pipe shows that about 99% percent of the coating appear to be firmly bonded to the steel substrate. Normal mechanical removal means have little effect upon the coating. By way of contrast, some conventional coatings have as much as 90% delamination from the steel substrate and mechanical means readily remove most of the coating.

EX 2

Duplicate Ex 1, but use two different EAA film web thicknesses, reduce the amount of color concentrate to 6 pbw, change the color to gray, alter the method of forming the protective coating and change conditions of laminating. One EAA film web has a thickness of 8.0 mils (0.20 mm) and serves as the inner adhesive layer. The other EAA film web has a thickness of 4.0 mils (0.10 mm)) and serves as the outer adhesive film layer. The gray color concentrate (Ampacet 19252, Ampacet Corporation) comprises 49.0 wt % LDPE, 49.0 wt % titanium dioxide, 1.0 wt % channel black, 0.6 wt % ultramarine blue pigment and 0.4 wt % octadecanoic acid, all percentages being based on concentrate weight.

Instead of using the heated nip rolls as in Ex 1, assemble the sandwich, place it in a platen press and apply pressure (25 tons (22,727 kilograms)(kg)), and heat (400° F. (204° C.)) for one minute to promote formation of the composite protective coating. Laminate the coating to a cleaned and pretreated galvanized steel sheet as in Ex 1, but reduce the line speed to 25 feet (7.6 meters) per minute and the lamination temperature to 400° F. (204° C.). Quench the laminate in a 55° F. (12.8° C.) water bath.

Cold form the single rib of rectangular shape into the laminate using a single roll former. The single roll former forms the rectangular shaped rib quickly using a single pass through a single forming die versus a standard forming method that employs multiple forming dies to slowly more gently form the rib.

A visual examination of the resulting cold-formed pipe shows that about 98% percent of the coating appears to be firmly bonded to the steel substrate. Normal mechanical removal means, such as a scraper, remove only about 10% of the coating.

EX 3

Duplicate Ex 2 save for changing the spunbond polyester web to a 0.50-ounce per square yard (0.014 kg per 0.84 square meters) weight (straight 2.2 denier per filament fibers, Remay® 2250, Xamax Industries, Inc.), and using two 6.0 mil (0.15 mm) film webs as in Ex 1. A visual examination of the resulting cold formed laminate shows the same results as in Ex 1.

EX 4

Duplicate Ex 3, but substitute a nylon web material (Thermanet®, from Conwed Plastics for the spunbond polyester web. A visual examination of the resulting cold formed laminate shows the same results as in Ex 1. The surface of the laminate has a rough texture that mimics the grid pattern of the nylon web material.

Similar results are attainable using variations of the metal substrate, the film web, the reinforcing material, lamination conditions and cold forming conditions, all of which are disclosed herein. In addition, the cold formed laminates serve as effective substrates for application of a further coating, such as a polyethylene layer, using techniques described herein.

What is claimed is:

1. A composite protective coating for a metal surface comprising:
   a. an inner adhesive film for adhering the coating to the metal surface, the inner film comprising:
      1) a first layer of a copolymer of ethylene and acrylic acid, and,
      2) a second layer of a copolymer of ethylene and acrylic acid, the first layer suitable for adhering to the metal surface and the second layer adhering to the first layer;
   b. a reinforcing layer adjacent to the second layer of the inner adhesive film and bonded thereto; and,
   c. an outer adhesive film adjacent to the reinforcing layer, the outer layer comprising:
      1) a first layer of a copolymer of ethylene and acrylic acid, and,
      2) a second layer of a copolymer of ethylene and acrylic acid, the first layer adhering to the reinforcing layer and the second layer adhering to the first layer.

2. The coating of claim 1, wherein the first layer of the outer adhesive flint is a corona-treated layer.

3. The coating of claim 1, wherein the second layer of each of the inner and outer adhesive films also, includes a color concentrate.

4. The coating of claim 3, wherein the color concentrate comprises a copolymer of ethylene and acrylic acid, polyethylene and carbon black.

5. The coating of claim 1, wherein reinforcing layer comprises a nonwoven material.

6. The coating of claim 5, wherein the nonwoven material is spunbond polyester.

7. The coating of claim 1, wherein said coating has a thickness of at least 0.010 inch (0.025 centimeters) and equal to or less than 0.030 inch (0.076 centimeters).

8. A cold-formable coated metal article comprising:
   a. a metal substrate;
   b. the composite protective coating of claim 1.

9. The article of claim 8, wherein the metal substrate is galvanized steel.

10. The article object of claim 8, wherein the metal substrate has a thickness of 0.064 to 0.109 inch (1.6 to 2.8 millimeters).

11. The article of claim 8, wherein the object is substantially free of delamination between the composite protective coating and the substrate following cold forming of the article through a 90° angle as specified in ASTM 762.

12. The article of claim 11, wherein no more than 10% of the composite protective coating delaminates from the substrate.

* * * * *